(12) United States Patent
Kim et al.

(10) Patent No.: US 8,206,044 B2
(45) Date of Patent: Jun. 26, 2012

(54) INTEGRATED OPTICAL SUB-ASSEMBLY

(75) Inventors: Hong-Man Kim, Daejeon (KR);
Wol-Yon Hwang, Daejeon (KR);
Jin-Soo Choi, Daejeon (KR);
Young-Bok In, Daejeon (KR); Do-Hun Kim, Daejeon (KR); Jae-Hyun Jin, Daejeon (KR)

(73) Assignee: Lightron Fiber-Optic Devices INS (KR)

( * ) Notice: Subject to any disclaimer, the term of this patent is extended or adjusted under 35 U.S.C. 154(b) by 792 days.

(21) Appl. No.: 11/575,084

(22) PCT Filed: Sep. 10, 2005

(86) PCT No.: PCT/KR2005/002993
§ 371 (c)(1),
(2), (4) Date: Aug. 27, 2009

(87) PCT Pub. No.: WO2006/028359
PCT Pub. Date: Mar. 16, 2006

(65) Prior Publication Data
US 2009/0310920 A1 Dec. 17, 2009

(30) Foreign Application Priority Data

Sep. 11, 2004 (KR) .................. 10-2004-0072844
Mar. 25, 2005 (KR) .................. 10-2005-0024723

(51) Int. Cl.
*G02B 6/36* (2006.01)

(52) U.S. Cl. .......................................................... 385/93
(58) Field of Classification Search .................. 385/93
See application file for complete search history.

(56) References Cited

U.S. PATENT DOCUMENTS

| | | | |
|---|---|---|---|
| 5,195,155 A * | 3/1993 | Shimaoka et al. | 385/90 |
| 5,359,689 A * | 10/1994 | Iwatsuka et al. | 385/73 |
| 5,388,171 A * | 2/1995 | Michikoshi et al. | 385/36 |
| 5,905,827 A * | 5/1999 | Naganuma et al. | 385/31 |
| 2003/0147601 A1 * | 8/2003 | Bartur et al. | 385/92 |
| 2004/0234204 A1 * | 11/2004 | Brun et al. | 385/39 |

FOREIGN PATENT DOCUMENTS

| | | |
|---|---|---|
| JP | 07077640 | 3/1995 |
| JP | 10290050 | 10/1998 |

OTHER PUBLICATIONS

International Search Report; PCT/KR2005/002993; Dec. 20, 2005.

* cited by examiner

*Primary Examiner* — Uyen Chau N Le
*Assistant Examiner* — Hoang Tran
(74) *Attorney, Agent, or Firm* — Cantor Colburn LLP

(57) ABSTRACT

Disclosed herein is an integrated optical sub-assembly for a diplexer, which can adopt a low-price small aperture isolator by disposing an isolator closer to a ferrule, such that the isolator may be distanced from a laser diode, and so the total cost can be reduced and the construction can be simplified; and an integrated optical sub-assembly for a triplexer, which has simplified construction for reducing the manufacturing costs, and whose exterior dimension can be reduced and the manufacturing can be easier by adopting a ball lens for narrowing the beam width.

3 Claims, 7 Drawing Sheets

INTEGRATED OPTICAL SUB-ASSEMBLY

TECHNICAL FIELD

The present invention relates to an optical sub-assembly. More particularly this invention relates to an integrated optical sub-assembly for a diplexer, which can adopt a small aperture isolator, and also relates to an integrated optical sub-assembly for a triplexer, which has simplified construction for reducing the manufacturing costs, and whose exterior dimension can be reduced and the manufacturing can be easier by adopting a ball lens for narrowing the beam width.

BACKGROUND ART

Generally, an optical sub-assembly is used for a passive optical network (PON) based on ITU-T G.983.3 standard, which covers the distribution of analog optical signals, such as CATV, as well as the bi-directional digital optical communication, such as Internet, through the optical fiber. For the optical sub-assembly, a diplexer and a triplexer are mostly being used.

For PON using two different optical wavelengths as an upstream and a downstream signal, the diplexer integrally includes a wavelength coupler, a laser diode, a digital receiver.

A system in charge of distributing the analog optical signal has three different optical signal bandwidths. Major bandwidths prescribed in ITU-T G.983.3 may include an upstream digital optical signal (1260-1360 nm) sent from a subscriber, a downstream digital optical signal (1480-1500 nm) including data and IP signal, and a downstream analog optical signal (1550-1560 nm) for distributing a video signal of, e.g., CATV.

A diplexer adapted to a conventional bi-directional communication is comprised of a laser diode (LD) for an upstream signal and a digital receiver (PIN-TIA) for receiving a downstream digital signal.

FIG. 1 is a perspective view showing a conventional integrated diplexer optical sub-assembly, FIG. 2 is a cross-section view showing the diplexer optical sub-assembly, and FIG. 3 shows a perspective view cross-sectioned from the optical sub-assembly in FIG. 2.

From the drawings, major constituents are a laser diode (LD) 11, a lens 12, a 45-degree -reflecting filter 13, a ferrule 14, and a receiver 15.

The laser diode (LD) 11 provides an optical signal, for which an approximately 1310 nm FP laser diode or a DFB laser diode may be used. The lens 12 delivers the optical signal from the LD 11 to the 45-degree-reflecting filter 13, which commonly includes an aspherical lens.

The 45-degree-reflecting filter 13 separates the upstream and downstream signals at an angle of 45°, in which the optical isolation between the signals is approximately −20 dB.

The ferrule 14 delivers the optical signal from the 45-degree-reflecting filter 13 to an optical fiber.

The receiver 15 receives the optical signal incident through the 45-degree-reflecting filter 13, which includes an analog receiver and a digital receiver. A digital receiver typically adopts InGaAs PIN-TIA.

In the above-constructed conventional optical sub-assembly, the optical signal irradiated from the LD 11 disadvantageously returns to itself because of being a little reflected on the surfaces of the lens 12, the filter 13, and the ferrule 14, instead of being transmitted them. The back-reflected optical signal exerts a bad influence on the oscillation of the LD 11, thereby increasing the noise in a system. This means that the performance of the system becomes deteriorated. To protect the returning back of the light to the LD 11, an optical isolator is generally used.

The optical isolator is a circuit device that is used for a circuit for transmitting microwave or optical wave, which can transmit the wave to one direction of a transmission line, but cannot transmit it to the opposite direction of the transmission line. Typically, this device utilizes a large Faraday rotation angle that a magnetic material has.

In general, the price of the optical isolator is expensive and increases in proportion to the effective aperture size of the isolator. This is an obstacle to the low-price policy of an optical sub-assembly. That is, the price for a commonly used isolator, whose effective aperture diameter is 1.5 mm, is expensively $70 or so. If a low-price isolator, whose value is approximately $20, has to be used, the isolator must be located as closer to the ferrule as possible in order to utilize a narrow range of a beam width.

However, in the case that the isolator is mounted closer to the ferrule, it is mechanically difficult to position the isolator closer to the ferrule because of the 45-degree-reflecting filter, and in addition, this structure deteriorates the performance of the receiver stage.

Therefore, it is necessary that the isolator be moved to the laser diode side. However, this enlarges the effective aperture size of the isolator because the beam width must be become wider, and so disturbs the low-price policy of the isolator.

In the meantime, a triplexer requires an analog optical receiving part in addition to the functions of the conventional diplexer, because it must distribute the analog and digital CATV signals. Such a triplexer covers three optical wavelength bands including an analog optical signal wavelength as well as the optical wavelengths assigned to the two digital signals.

Unlike the diplexer, used for the conventional bi-directional communication, which comprises a laser diode (LD) for an upstream signal and a digital receiver (PIN-TIA) for a downstream digital signal, the triplexer further comprises a part for separating the analog optical signal out of the digital signal, because the triplexer must cover a downstream analog optical signal distributed to the conventional diplexer.

The triplexer is generally divided by integration degree into an external WDM coupler type triplexer, a built-in WDM coupler type triplexer, and an integrated triplexer.

Among these, although it is predicted that the integrated triplexer becomes a mainstream in the long run, the separation type triplexer that a WDM coupler is externally attached or internally built can be partially used for a middle stage or a particular system. The separation type triplexer can be used when the integrated triplexer cannot be immediately adapted to the ready-established subscriber system or when the analog signal and the digital signal are processed by the separate circuits.

Since this triplexer covers three optical wavelength bands and satisfies the optical and electrical performances for the digital and analog signals, the design and manufacturing processes are more diverse and difficult.

FIG. 4 is an exploded perspective view showing a conventional integrated triplexer. It includes an optical fiber 21, an optical fiber collimating lens 22, an analog receiver 23, an analog receiver-collimating lens 24, a 45-degree-reflecting filter 25, a laser diode 26, a laser diode-collimating lens 27, a digital receiver 28, and a digital receiver-collimating lens 29.

The analog receiver 23 receives an analog optical signal. After the optical fiber collimating lens 22 converts the analog optical signal provided from the optical fiber 21 into a parallel beam, the analog receiver-collimating lens 24 delivers the parallel beam to the analog receiver 23.

The 45-degree-reflecting filter 25 separates the upstream and downstream signals at an angle of 45?, in which the optical isolation between the digital signals is approximately −20 dB. For the laser diode 26, an approximately 1310 nm FP laser diode or a DFB laser diode is used.

The laser diode-collimating lens 27 converts the light irradiated from the laser diode 26 into a parallel beam. Its effective focal length is approximately 1.5 mm, but this may be varied according to the design specifications.

The digital receiver 28, generally comprising InGaAs PIN-TIA, receives a digital optical signal. After the optical fiber collimating lens 22 converts the analog optical signal provided from the optical fiber 21 into a parallel beam, the digital receiver-collimating lens 29 delivers the parallel beam to the digital receiver 28. For the digital receiver-collimating lens 29, aspherical or spherical lens is used.

However, the conventional integrated triplexer optical sub-assembly has complicated structure and so its manufacturing cost increases, because many collimating lenses and mechanical elements are required for it. In addition, since the beam width is wider because of the collimating lenses, a filter size must be enlarged, thereby the external dimension increasing and manufacturing being difficult.

DISCLOSURE

Technical Problem

Therefore, the present invention has been made to solve the above-mentioned problems of the conventional optical sub-assembly, and it is an object of the present invention to provide an integrated optical sub-assembly for a diplexer, which can adopt a low-price small aperture isolator by disposing an isolator closer to a ferrule, such that the isolator may be distanced from a laser diode, and so the total cost can be reduced and the construction can be simplified.

It is another object of the present invention is to provide an integrated optical sub-assembly for a triplexer, which has simplified construction for reducing the manufacturing costs, and whose exterior dimension can be reduced and the manufacturing can be easier by adopting a ball lens for narrowing the beam width.

Technical Solution

To achieve the above object, there is provided an integrated optical sub-assembly for a diplexer, comprising: a laser diode for outputting an optical signal; a lens, located in front of the laser diode, for delivering the optical signal from the laser diode, an isolator for receiving the optical signal from the laser diode, through the lens; a glass ferrule for passing the optical signal, the glass ferrule being disposed, so that one end of the glass ferrule faces the isolator and opposite end is connected to an optical fiber; a total internal reflection glass for reflecting an incident optical signal by the angle of 50-60?, the total internal reflection glass being disposed under the glass ferrule, and; a receiver for receiving an optical signal from the total internal reflection glass; whereby the isolator is located closer to the glass ferrule, such that the isolator may be distanced at a given distance from the laser diode.

Further, the isolator of the present invention is disposed to be in contact with a front surface of the glass ferrule.

Further, an effective aperture diameter of the isolator is 0.2-1 mm.

Meanwhile, to achieve the above another object, there is provided an integrated optical sub-assembly for a triplexer, comprising: an analog receiver for receiving through a ball lens thereof an incoming analog optical signal; a glass capillary for receiving an incident light from the optical fiber; a glass capillary end face reflecting filter formed on an end surface of the glass capillary at a given angle; a total internal reflection glass disposed on the glass capillary, having at its one end a filter face for separating an analog optical signal out of a digital optical signal, and also having an angularly polished filter portion for perpendicularly reflecting the light reflected at the glass capillary end face reflecting filter, to deliver the light to the analog receiver or a digital receiver; a laser diode for outputting an optical signal to the end portion of the glass capillary through a ball lens thereof; a digital receiver, disposed under the glass capillary, for receiving through a ball lens thereof the digital or the analog optical signal provided from the glass capillary end face reflecting filter.

Moreover, an angle of the end surface of the glass capillary end face reflecting filter is 6? to 15?, and an angle of the polished filter portion at one end of the total internal reflection glass is 50? to 60?, so that it can further reflect perpendicularly the light reflected on the glass capillary end face reflecting filter.

Further, a filter is formed on an upper portion of the total internal reflection glass, so that it passes only analog or digital wavelength of the optical signal.

Advantageous Effects

From the foregoing, according to the integrated optical sub-assembly for a diplexer, a small aperture isolator can be adapted by being disposed closer to a glass ferrule such that the isolator may be distanced from a laser diode, and therefore the total cost can be reduced and the construction can be simplified. In addition, since the small aperture isolator whose effective aperture diameter is 0.2-1 mm may be utilized for the present invention, a low-price policy can be accomplished.

In addition, according to the integrated optical sub-assembly for a triplexer, by employing the total internal reflection glass, the glass capillary end face reflecting filter, and the glass capillary, the construction of the optical sub-assembly is simplified and this reduces the manufacturing costs, and since the beam width becomes narrower by adopting a ball lens, the exterior dimension can be reduced, the manufacturing can be easier, and the production cost can be diminished.

DESCRIPTION OF DRAWINGS

The above and other objects, features, and advantages of the present invention will become more apparent from the following description when taken in conjunction with the accompanying drawings, in which.

BEST MODE

Hereinafter, preferred embodiments to effectively achieve the object of the present invention will be described in detail with reference to the attached drawings.

Figure 1:
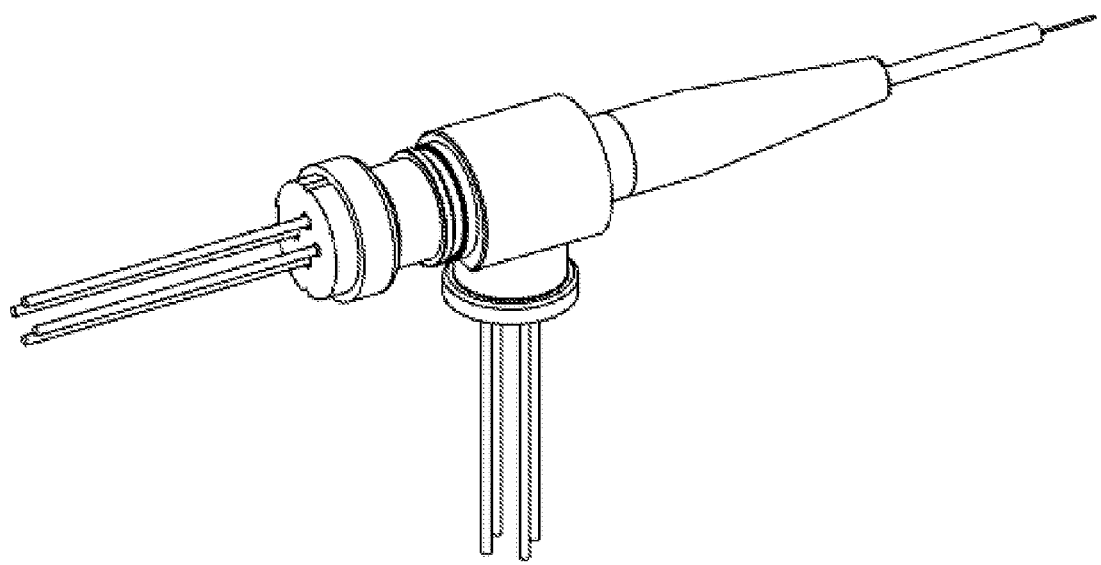
FIG. 1 is a perspective view showing a conventional integrated diplexer optical sub-assembly.
Figure 2:
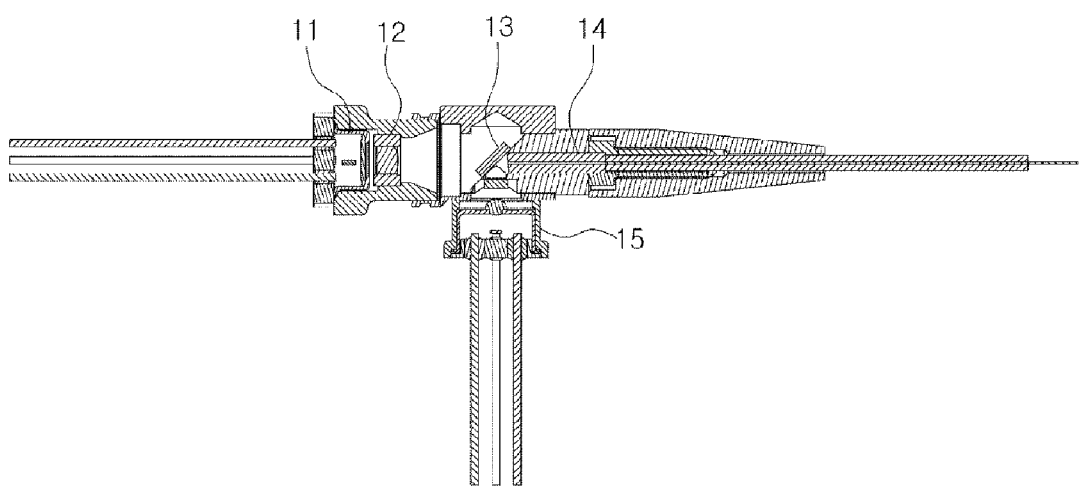
FIG. 2 is a cross-section view showing the diplexer optical sub-assembly.
Figure 3:
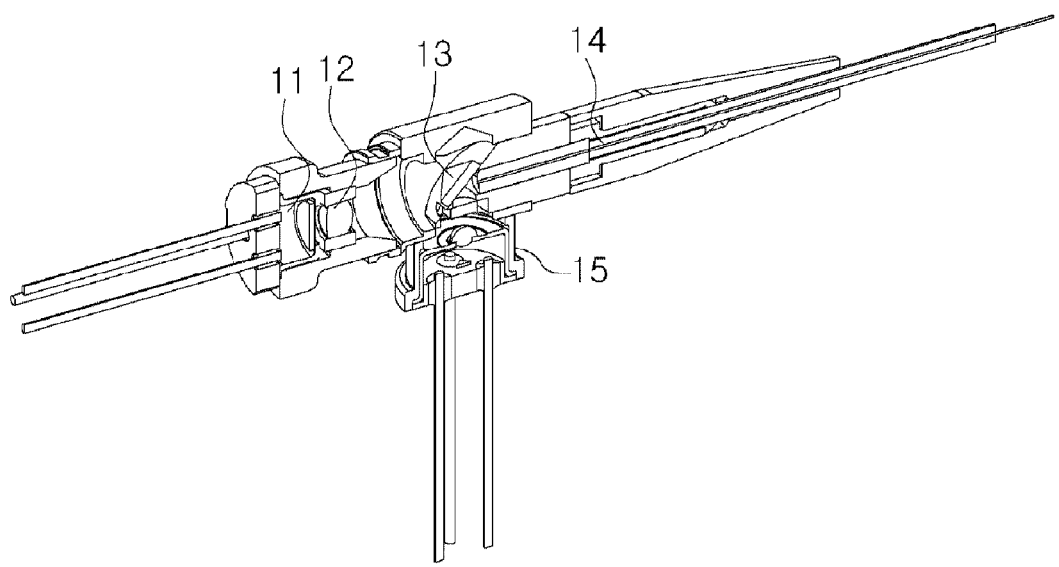
FIG. 3 shows a perspective view cross-sectioned from the optical sub-assembly in FIG. 2.
Figure 4:
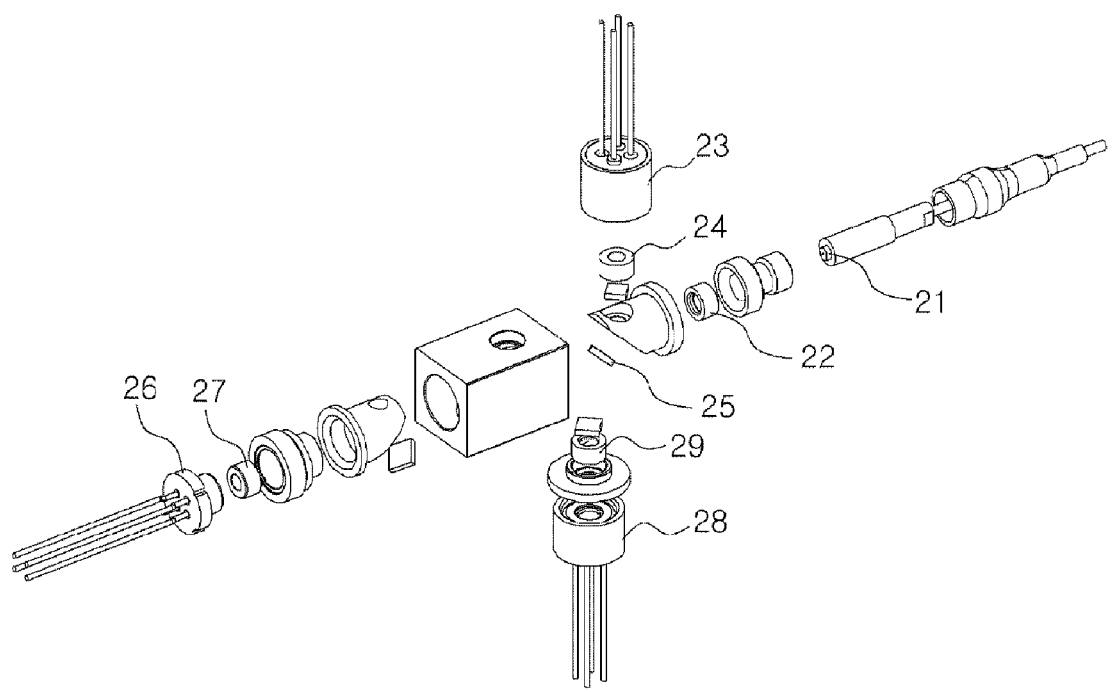
FIG. 4 is an exploded perspective view showing a conventional integrated triplexer.
Figure 5:
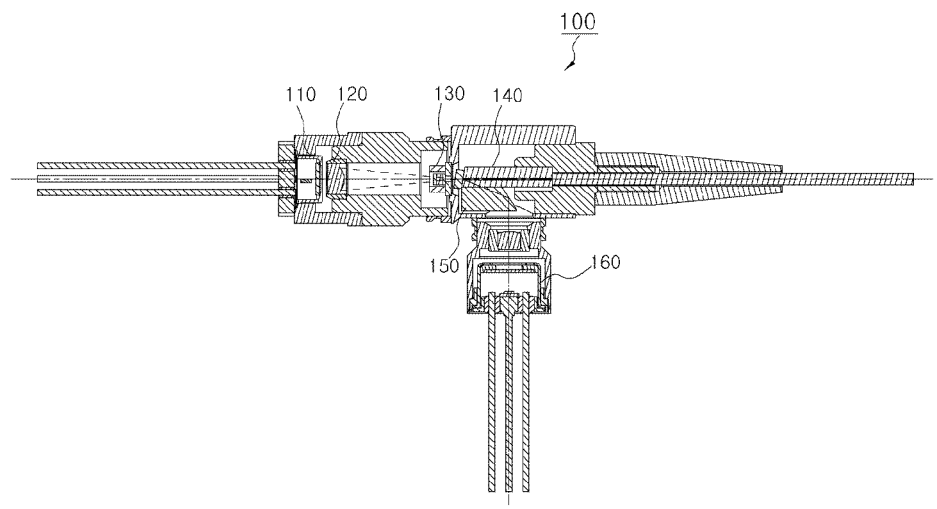
FIG. 5 is a cross-sectional view showing an integrated optical sub-assembly according to the present invention.
Figure 6:
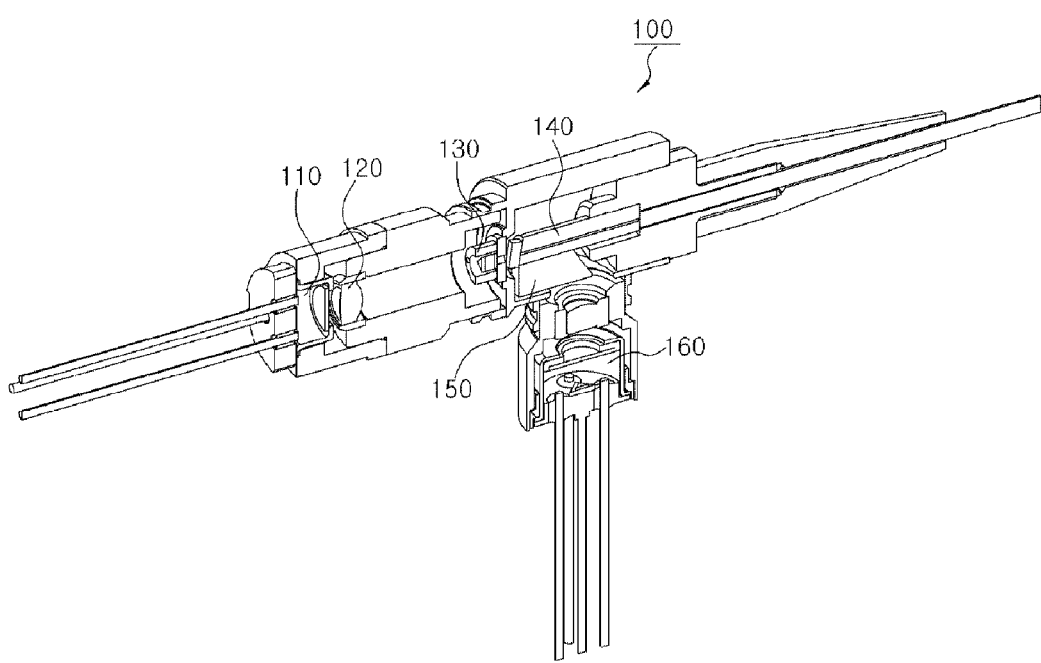
FIG. 6 shows a perspective view cross-sectioned from the optical sub-assembly in FIG. 5.

FIG. 5 is a cross-sectional view showing an integrated optical sub-assembly according to the present invention, and FIG. 6 shows a perspective view cross-sectioned from the optical sub-assembly in FIG. 5.

As is shown, the integrated diplexer optical sub-assembly 100 comprises a laser diode 110, a lens 120, an isolator 130, a glass ferrule 140, a total internal reflection glass 150, and a receiver 160.

The laser diode 110 outputs an optical signal, and the lens 120, located in front of the laser diode 110, delivers the optical signal from the laser diode 110.

The isolator 130 receives the optical signal from the laser diode 110, through the lens 120. As mentioned before, the isolator is a device that is used for a circuit for transmitting microwave or optical wave, which can transmit the wave to one direction of a transmission line, but cannot transmit it to the opposite direction of the transmission line.

The glass ferrule 140 passes the optical signal, which is disposed, so that one end of the glass ferrule 140 faces the isolator 130 and opposite end is connected to an optical fiber.

The total internal reflection glass 150 is disposed under the glass ferrule 140 and reflects the incident light by the angle of 50-60?. A filter for passing a particular wavelength of the optical signal is formed on a surface, which faces the receiver, of the total internal reflection glass 150.

The receiver 160 receives an optical signal from the total internal reflection glass 150.

Here, the isolator 130 is located closer to the glass ferrule 140, such that the isolator 130 may be distanced at a given distance from the laser diode 110.

By disposing the isolator 130 closer to the glass ferrule 140, such that the isolator 130 may be distanced from the laser diode 110, the width of the beam provided from the laser diode 110 can be narrowed.

Therefore, a low-price isolator whose effective aperture diameter is 0.2-1 mm is adapted, and the optical signal outputted from the laser diode 110 is received by the isolator through the lens 120. The received optical signal is delivered to the glass ferrule 140.

The glass ferrule 140 passes the optical signal through the total internal reflection glass 150 disposed thereunder and the optical fiber connected thereback. The total internal reflection glass 150, disposed under the glass ferrule 140, reflects the incident light by the angle of 50-60?.

The receiver 160 receives the optical signal provided from the total internal reflection glass 150. Therefore, by positioning an isolator closer to a glass ferrule, such that the isolator may be distanced from a laser diode, the beam width can be narrowed, and so it is possible that a low-price small aperture isolator is employed. Thus the total cost can be reduced and the construction can be simplified.

Figure 7:
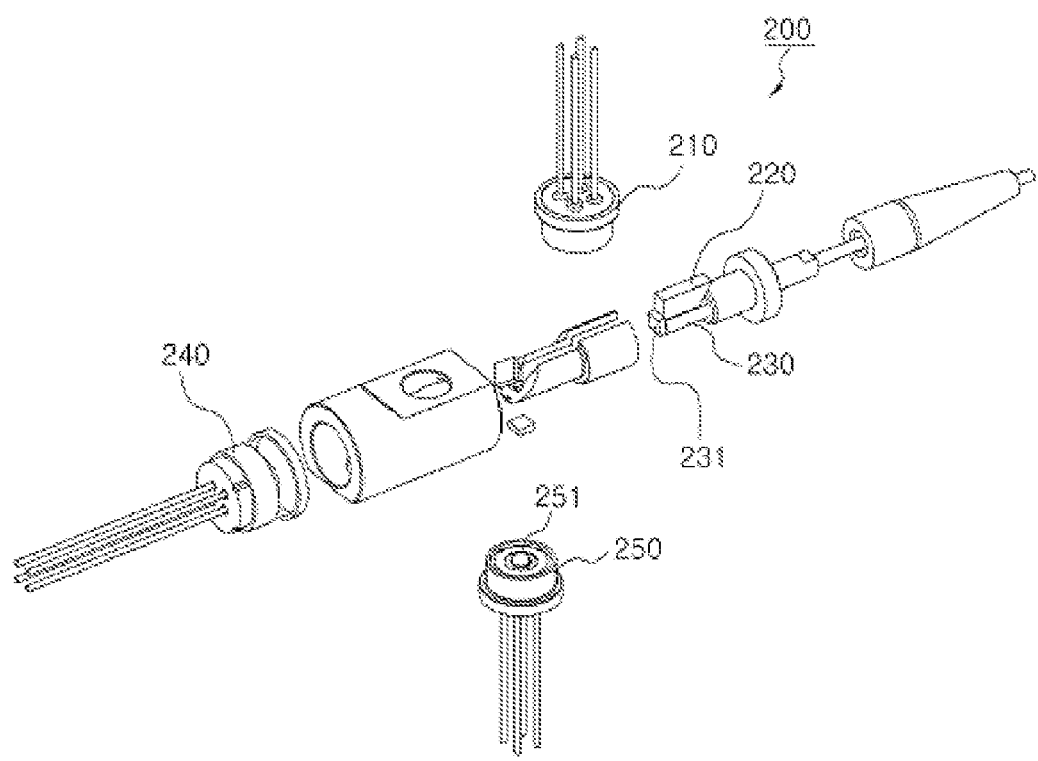
FIG. 7 is an exploded perspective view showing an integrated triplexer optical sub-assembly according to the present invention.

FIG. 7 is an exploded perspective view showing an integrated triplexer optical sub-assembly according to the present invention.

As is shown, the integrated triplexer optical sub-assembly 200 is comprised of an analog receiver 210, a glass capillary 230, a glass capillary end face reflecting filter 231, total internal reflection glass 220, a laser diode 240, and a digital receiver 250.

The analog receiver 210 receives through a ball lens 211 the incoming analog optical signal, and the glass capillary 230 receives the incident light from the optical fiber.

The glass capillary end face reflecting filter 231 is formed on an end surface of the glass capillary 230 at a given angle. The end surface of the glass capillary 230 should be polished at the same angle as that of the glass capillary end face reflecting filter 231, so that it confronts to the glass capillary end face reflecting filter 231.

The total internal reflection glass 220 is disposed on the glass capillary 230, and the incident light is delivered to the analog receiver 210 through an angularly polished filter portion formed at one end of the total internal reflection glass 220.

The angularly polished filter portion at one end of the total internal reflection glass 220 is formed, so that it can perpendicularly reflect the light reflected at the glass capillary end face reflecting filter 231. For this, the upper surface is polished at 0°.

It is preferable that the angle "a" of the glass capillary end face reflecting filter 231 is 6? to 15?. In addition, it is preferable that the angle "b" of the polished filter portion at one end of the total internal reflection glass 220 is 50? to 60?, so that it can further reflect perpendicularly the light reflected on the glass capillary end face reflecting filter 231.

On the upper surface "c" of the glass capillary is formed a filter for passing a specific wavelength of the light. In the preferred embodiment, the filter selectively passes the analog optical signal only.

The laser diode 240 outputs the optical signal to the end portion of the glass capillary 230 through a ball lens 16 of the laser diode.

The digital receiver 250, disposed under the glass capillary 230, receives through a ball lens 251 the digital optical signal provided from the glass capillary end face reflecting filter 231.

Figure 8:
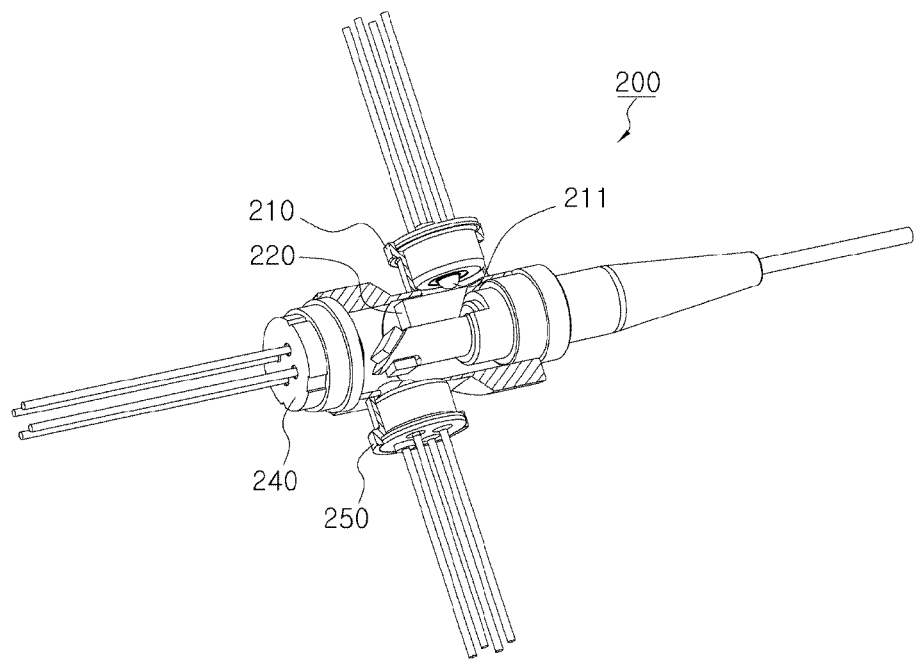
FIG. 8 is a perspective view partially sectioned from the optical sub-assembly in FIG. 7.
Figure 9:
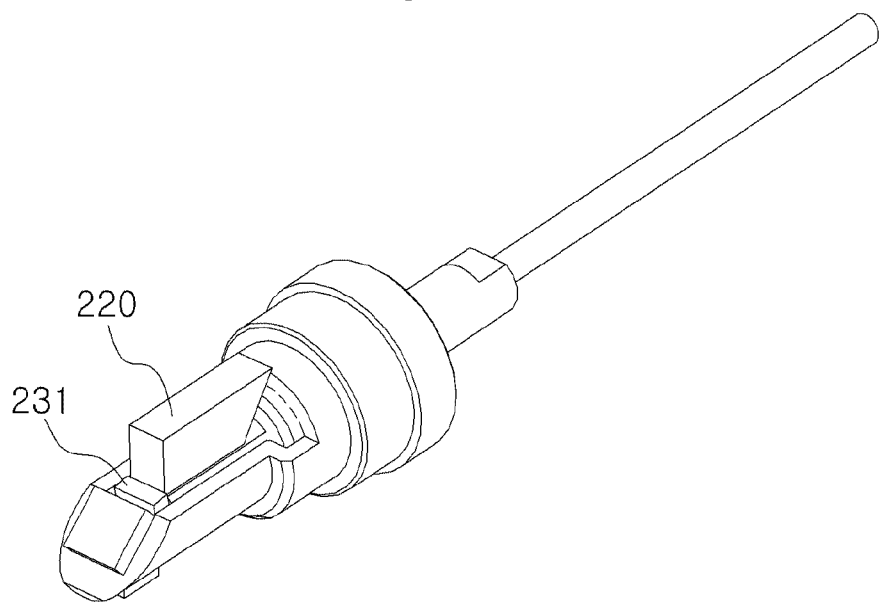
FIG. 9 is a partial enlarged view from the optical sub-assembly in FIG. 7.

In addition, FIG. 8 and FIG. 9 are, respectively, a perspective view partially sectioned from the optical sub-assembly and a partial enlarged view from the optical sub-assembly in FIG. 7. It is noted from the drawings that the glass capillary 230 receives the light outputted from the optical fiber, the glass capillary end face reflecting filter 231 is formed at the end portion of the glass capillary 230, and on the glass capillary 230 is disposed the total internal reflection glass 220, whose one end forms an angularly polished filter portion to deliver the incident light to the analog receiver 210.

Figure 10:
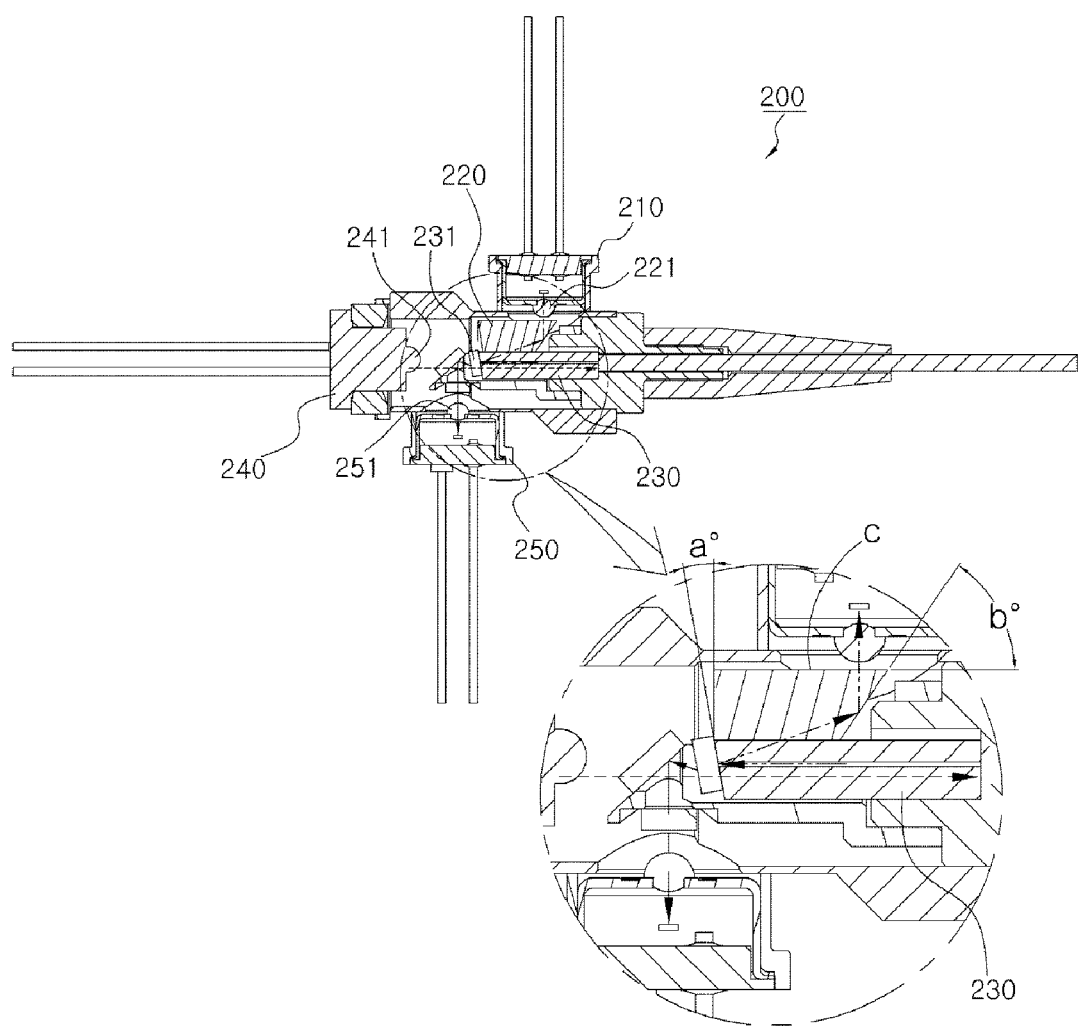
FIG. 10 is a side sectional view from FIG. 7.
Figure 11:
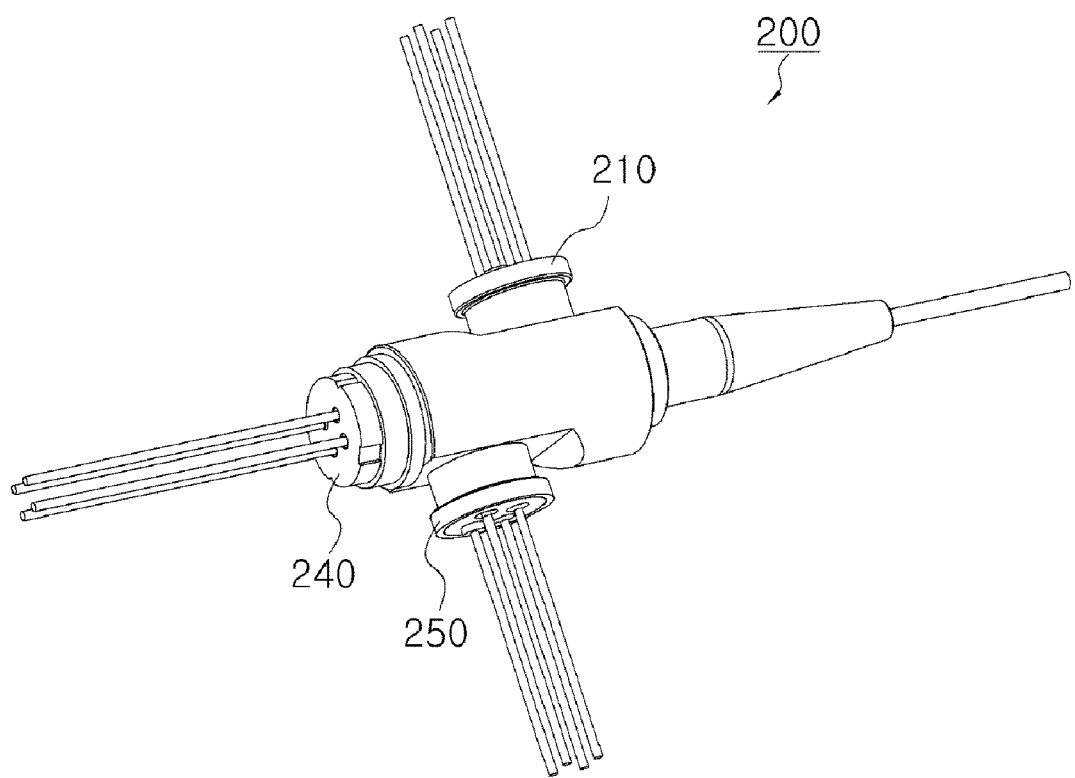
FIG. 11 is an assembled perspective view of the present invention.

FIG. 10 is a side sectional view from FIG. 7, and FIG. 11 is an assembled perspective view of the present invention. Referring to the drawings, the operation of the present invention will be explained.

The glass capillary 230 receives the optical signal outputted from the optical fiber, and the received optical signal is provided to the total internal reflection glass 220 after being reflected at the glass capillary end face reflecting filter 231 formed at the end portion of the glass capillary 230.

The total internal reflection glass 220 delivers the incident optical signal to the analog receiver 210, by using its total reflection surface polished at a given angle to reflect the incident optical signal perpendicularly. The analog receiver 210 receives through the ball lens 211 the incident analog optical signal.

In addition, the digital receiver 250, disposed under the glass capillary 230, receives through the ball lens 251 the digital optical signal provided from the glass capillary end face reflecting filter 231.

Meanwhile, the laser diode 240 outputs the optical signal to the end portion of the glass capillary 230, through the ball lens 241 thereof.

Unlike the conventional triplexer optical sub-assembly which reflects the analog optical signal of 1550 nm by a 45-degree-reflecting filter, the integrated triplexer optical sub-assembly according to the present invention employs the glass capillary end face reflecting filter 231, the glass capillary 230, and the total internal reflection glass 220, such that the reflecting filter reflects the analog optical signal simultaneously with passes the digital signal of 1310 nm and 1490 nm.

In addition, the integrated triplexer optical sub-assembly according to the present invention employs the ball lenses 211, 241, 251 dedicated to the analog receiver 210, the laser diode 240, the digital receiver 250, respectively.

By employing the glass capillary end face reflecting filter 231, it is easier to design and manufacture a filter. By using the ball lenses, it is unnecessary to use the parallel beams, and since its beam width is narrower, the filter size can be reduced. Additionally, since the number of constituents is reduced, the exterior dimension of the optical sub-assembly can be shrunken and manufacturing becomes easier and the production cost can be reduced.

From the foregoing, although the preferred embodiment has been illustrated and explained, the scope of the present invention is not limited to the embodiment. It will be understood by those skilled in the art that various changes in form and details may be made therein without departing from the spirit and scope of the invention as defined by the appended claims.

The invention claimed is:

1. An integrated optical sub-assembly for a diplexer, comprising:
   a laser diode for outputting an optical signal,
   a lens located in front of the laser diode, for delivering the optical signal from the laser diode,
   an isolator for receiving the optical signal from the laser diode, through the lens,
   a glass ferrule for passing the optical signal, the glass ferrule being aligned along an extension of an axial line of the laser diode, the lens and the isolator and disposed such that one end of the glass ferrule faces the isolator and opposite end is connected to an optical fiber,
   a total internal reflection glass for reflecting an incident optical signal by an angle of substantially 50°-60°, the total internal reflection glass being disposed under the glass ferrule, and
   a receiver for receiving an optical signal from the total internal reflection glass,
   wherein the isolator is adhered to a front surface of the glass ferrule, such that the isolator is placed at a given distance from the laser diode.

2. The integrated optical sub-assembly according to claim 1, wherein an effective aperture diameter of the isolator is substantially 0.2-1 mm.

3. An integrated optical sub-assembly for a triplexer, comprising:
   an analog receiver for receiving through a ball lens thereof an incoming analog optical signal,
   a glass capillary for receiving an incident light from an optical fiber, the glass capillary being positioned perpendicular to the analog receiver,
   a glass capillary end face reflecting filter formed on an end surface of the glass capillary at a given angle,
   a total internal reflection glass disposed on the glass capillary, to form a filter portion with a polished angle for perpendicularly reflecting the light reflected at the glass capillary end face reflecting filter, delivering the light to the analog receiver and passing only analog wavelength of the optical signal by using a filter formed on an upper portion thereof,
   a laser diode for outputting an optical signal to an end portion of the glass capillary through a ball lens thereof,
   a digital receiver, disposed under the glass capillary, for receiving through a ball lens thereof a digital optical signal provided from the glass capillary end face reflecting filter,
   wherein an angle of the end surface of the glass capillary end face reflecting filter is substantially 6° to 15°, and
   wherein an angle of the polished filter portion at one end of the total internal reflection glass is substantially 50° to 60°.

* * * * *